Feb. 12, 1952  J. HALAHAN ET AL  2,585,460
VARIABLE SPEED COUPLING
Filed June 3, 1949  2 SHEETS—SHEET 1
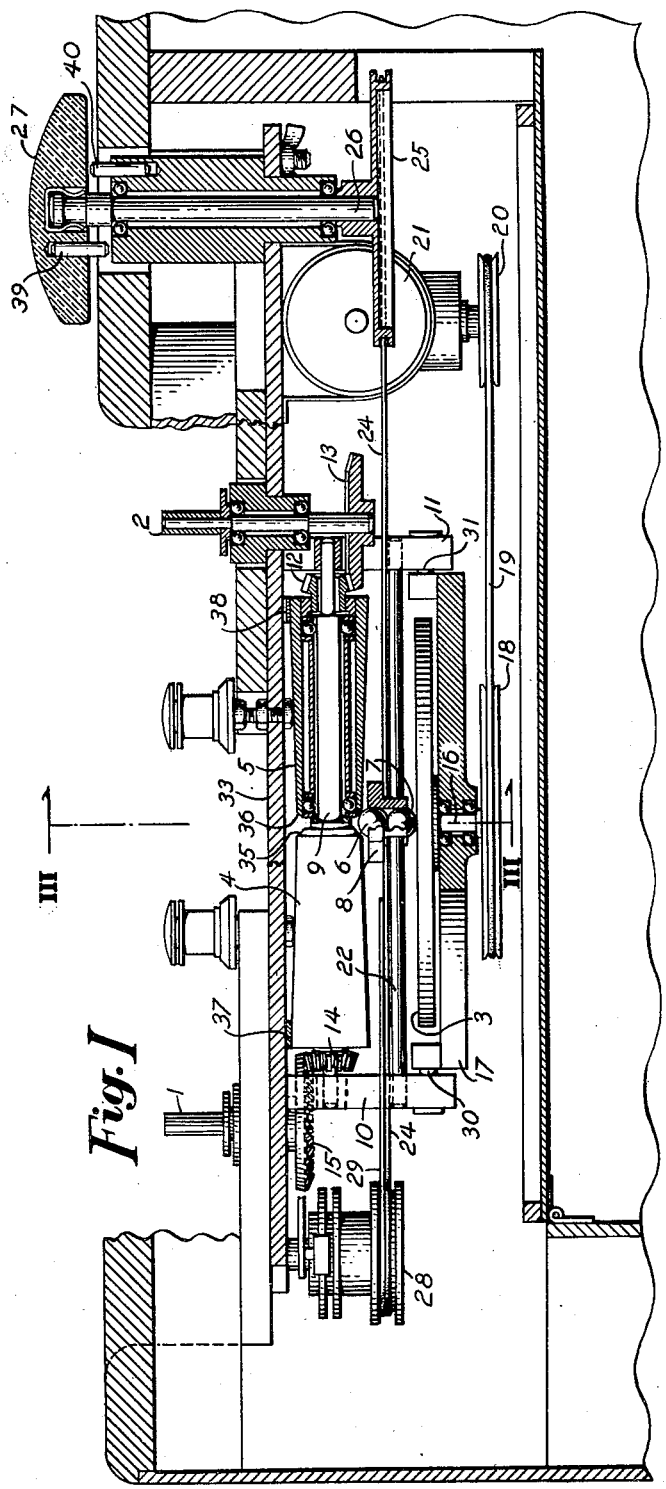
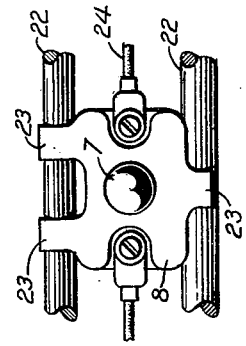
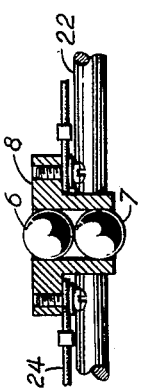
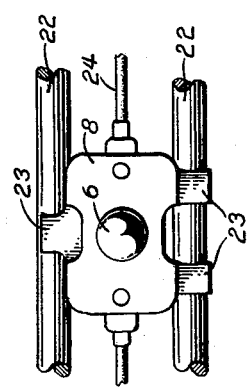
John Halahan
Theodore F. Aronson
Floyd A. Lyon
BY INVENTORS
ATTORNEY Feb. 12, 1952     J. HALAHAN ET AL     2,585,460
VARIABLE SPEED COUPLING Filed June 3, 1949     2 SHEETS—SHEET 2

John Halahan
Theodore F. Aronson
Floyd A. Lyon
INVENTORS
ATTORNEY

Patented Feb. 12, 1952

2,585,460

UNITED STATES PATENT OFFICE 2,585,460

VARIABLE-SPEED COUPLING

John Halahan, Theodore F. Aronson, and Floyd A. Lyon, Elmhurst, N. Y., assignors to Remington Rand Inc., New York, N. Y., a corporation of Delaware Application June 3, 1949, Serial No. 96,891

2 Claims. (Cl. 74—193)

1

The invention relates to variable speed coupling means.

The invention provides a variable speed frictional coupling, the drive ratio through which may be variable from zero up to a predetermined high ratio.

The invention also provides a variable speed coupling device in which the drive is transmitted between driving and driven elements of the coupling through a single member readily controllable for variation of the drive ratio and preferably also for variation of the direction of drive through the coupling.

The invention also provides a variable speed frictional coupling incorporating means giving an infinitely variable drive ratio over a predetermined range of operation, and in which such means, though providing for very light control, are so adapted and arranged as to render the possibility of slip unlikely at high ratios under the driving loads for which the coupling device is designed despite the non-positive drive relationship existing between purely frictional couplings as compared with positive gearing.

The ensuing description deals with an embodiment of the invention developed to provide a variable speed friction coupling for use in a micro-film reader described in application S. N. 96,892, filed June 3, 1949, of applicancy and assignment common with the instant application, wherein the requirement is film feed drive in both directions and variation of ratio from zero up to the predetermined maximum. It is, however, to be understood that, though the ensuing description deals with that embodiment, the variable speed coupling per se has wide application apart from that particular embodiment, and especially where a coupling is required which calls for sensitive and light control to give an infinitely variable drive ratio through a predetermined range of operation but where high torque loading is not involved.

In the drawings:

Fig. 1 is a sectional elevation taken through the drive mechanism of a micro-film reader embodying a coupling according to the present invention, certain parts being shown broken away for better understanding of the invention.

Figs. 4, 5 and 6 are respectively a plan view, a sectional elevation taken longitudinally, and a view looking on the under side of the intermediate drive member of the coupling shown in Figs. 1, 2 and 3.

2

Figure 2:
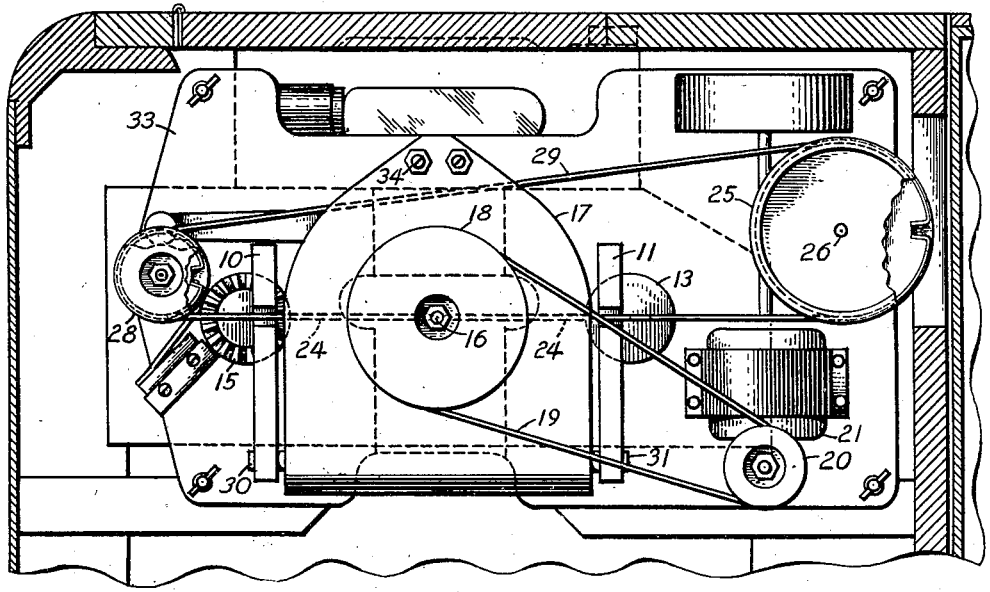
Fig. 2 is a view on a reduced scale looking on the under side of Fig. 1.

In the particular embodiment illustrated the requirement is that the film spool mounting spindles 1 and 2 should be selectively drivable in either direction thus for normal feeding of the film, the take-off spool is mounted on the spindle 2 which is driven and draws film from a supply or storage spool mounted on the spindle 1, which is otherwise freely rotatable. On the other hand, when it is desired to rewind film, the drive is reversed so that the spindle 1 is driven, leaving the spindle 2 free.

The essential elements of the coupling illustrated are the drive disc 3, the driven rollers 4 and 5 and the intermediate drive transmitting means constituted by the balls 6 and 7 mounted in the ball locating cage 8.

The rollers 4 and 5 are hollow and are preferably tapered, increasing in diameter toward the outer end. The rollers are mounted for free rotation on the roller mounting shaft 9, the reduced ends of which are carried by the frame members 10 and 11. It will be noted that the rollers 4 and 5 are spaced apart, and at its outer end each roller, as seen in Fig. 1 mounts a bevel pinion. Thus, at its outer end the roller 5 has the bevel pinion 12 which, being non-rotatably mounted with respect to the roller, is capable of transmitting drive therefrom through the crown wheel 13 to the take-off film spool mounting spindle 2. Similarly the bevel pinion 14 transmits drive through the crown wheel 15 to the spindle 1 which serves to receive a film supply or storage spool.

The drive disc 3 is mounted on a spindle 16, freely rotatable in a bearing with respect to the mounting plate 17. A pulley 18 is fast on the lower end of the drive disc mounting spindle 16 to which drive is transmitted through the driving belt 19 from the output drive pulley 20 of the electric motor 21.

The lower ball 7 of the intermediate drive member of the coupling rests upon the upper surface of the drive disc 3, and the ball cage 8 as a whole is movable along a diameter of the drive disc 3 parallel with the axis of the rollers 4 and 5 in order to bring the upper ball 6 into engagement with the periphery of the rollers 4 and 5, according to the direction of movement of the ball cage from its neutral central position as shown in the drawing. In the neutral position of the ball cage rotation of the drive disc 3 merely rotates the lower ball 7 about an axis coincident with that of the drive disc mounting spindle 16, and the lower ball 7 transmits similar motion to the upper ball 6, which however, in the neutral position, engages in the space between the inner ends of the rollers 4 and 5, and thus transmits no drive to either roller and neither the spindle 1 nor the spindle 2 is then driven. If, on the other hand, the ball cage is moved to a point eccentric with respect to the center of the drive disc 3, the lower ball 7 is, by virtue of its engagement with the surface of the disc, caused to rotate about an axis parallel with a radius of the disc, which rotary movement is transmitted through the ball 6, the roller 4 or 5, as the case may be, according to the direction in which the ball cage is moved, and rotation of the cooperating roller results. The greater the eccentricity of the ball cage setting, the higher becomes the drive ratio through the coupling. Transmission of drive through the balls to the roller 5 drives the take-off film mounting spindle 2 for normal film feed, the mounting spindle 1 for the film supply or storage spool then being freely rotatable to allow film to run off unimpeded. Conversely, if the drive is transmitted through the roller 4, the spindle 1 is rotated in the opposite direction for film rewinding leaving the spindle 2 freely rotatable.

The path of movement of the ball cage 8 is defined by guide rails 22 extending between the frame side members 10 and 11 in parallel relationship with respect to each other and with respect to the axis of the rollers 4 and 5, the ball cage being provided at its edges with lugs 23 having apertures slidably engaging the guide rails 22. A flexible control cable 24 extends in opposite directions from the ball cage 8. At one end the control cable 24 is anchored to the pulley 25 fixed on the lower end of the control spindle 26 at the upper end of which the externally accessible control knob 27 is provided. The other end of the control cable is similarly wrapped around the pulley 25 and has its extremity anchored to the pulley 28, and an uninterrupted flexible cable 29, see Fig. 2, has its end likewise anchored to the pulleys 25 and 28 so that it runs on the side of the pulleys opposite the control cable 24. The cable 29 serves virtually as a link, and is necessary because the control member 24, being flexible, can serve for movement of the ball cage 8 only when operating in tension, and it is therefore necessary for positive action without possibility of slippage that the pulleys 25 and 28 shall both be positively rotatable under the influence of the control knob 27. It will also be appreciated that, on account of the flexibility of the cables 24 and 29, a limit of control movement is reached when, with rotation of a pulley, the point of anchorage of a cable coincides with the tangent at which the run of cable diverges from the pulley. Thus, in the arrangement shown, see especially Fig. 2, the larger pulley 25 provides for approximately 90° rotation in either sense from the neutral setting in which it is shown and, therefore, in order to accommodate the correspondingly greater range of rotation of the smaller pulley 28 the cable ends wrap round it in opposite senses to an extent considerably greater than the 90° embracement of the larger pulley 25.

Figure 3:
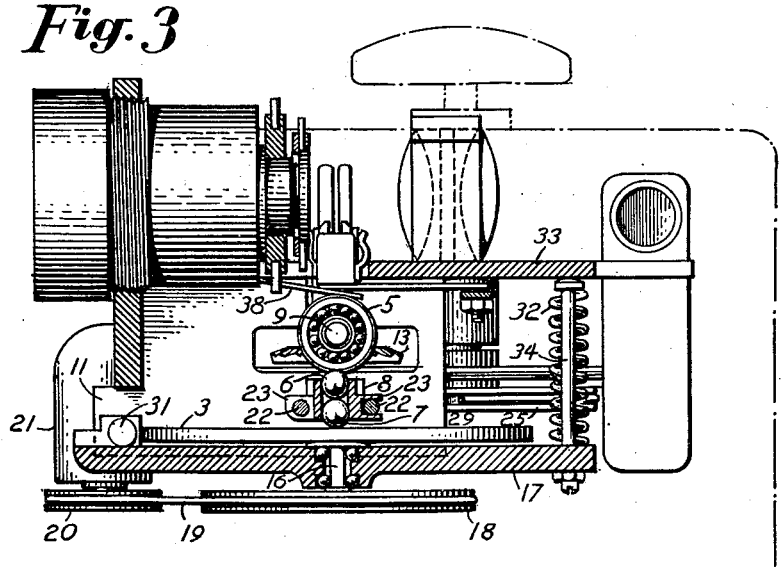
Fig. 3 is a section on the line III—III of Fig. 1.

It has been stated that the rollers 4 and 5 are tapered, being wider at their outer ends than at their adjacent inner ends, and it will be noted that the plate 17 which mounts the drive disc bearing is pivotally mounted on an axis defined by the shafts 30, 31 extending out at each side of the plate for engagement with the frame members 10 and 11 respectively. At its end remote from its pivotal connection with frame members 10 and 11 the plate is provided with a tension spring 32 (see Fig. 3) which has one end anchored to the plate 17 and its other end anchored to the upper frame member 33. The spring 32 pulls its end of the plate 17 upwardly so that, with the balls 6 and 7 at any setting of the ball cage other than the neutral setting in which it is seen in Fig. 1, the balls are gripped between the drive disc 3 and the roller 5, or the roller 4, to which the drive is for the time being transmitted.

The function of the taper on the rollers 4 and 5 in conjunction with the function of the spring 32 is two-fold since, on the one hand, it takes care of any lack of parallelism as between the shaft 9 and the surface of the drive disc 3 which might otherwise permit slip in drive transmission, and, on the other hand, it ensures that the gripping action increases with greater eccentricity of the ball cage. The distance piece 34 extending up from the plate 17 alongside the spring 32 limits upward movement of the free end of the plate 17, and is of such length as to ensure that, in the neutral position, the upper ball 6 in the space between the rollers contacts neither the roller 4 nor the roller 5. In order to make the neutral position less critical the inner ends of the rollers 4 and 5 are beveled, as indicated at 35 and 36 respectively (see Fig. 1) and leaf spring members 37 and 38 extend from the under side of the top frame member 33 to bear with frictional engagement upon the respective rollers to limit their coasting action.

Stop members 39 and 40 are preferably provided for engagement with cooperating stop members to define positively the limits of control knob movement.

Though there are cases in which it may be quite feasible to employ a single ball for transmitting drive between the drive disc 3 and the roller 4 or 5 as the case may be, the employment of the two balls 6 and 7, one upon the other in the ball cage 8, provides for a light and sensitive control because, when the eccentricity of the ball cage 8 is being varied to alter the drive ratio through the coupling, the two balls roll upon each other and upon the surfaces of the drive disc 3 and the operative roller 4 or 5, as the case may be, which they respectively engage.

The invention claimed is:

1. A variable speed drive coupling comprising disc mounted for rotation about its axis, two coaxially arranged spaced rollers extending outwardly one on each side of the axis of said disc in spaced relationship with respect to said disc for rotation about an axis substantially parallel with respect to the plane of said disc independent of each other, ball means engageable for drive transmission between said disc and one or other of said rollers selectively, resilient means normally moving said disc into engagement with said ball means whereby said ball means engage said rollers, means limiting the movement of said disc by said resilient means to hold said ball means out of engagement with said rollers in the center position, and control means interposed between said disc and said rollers for moving said ball means selectively inwardly and outwardly longitudinally of either of said rollers; whereby said ball means can be located selectively in a neutral position defined by the space between said rollers where no drive is transmitted, in engagement between said disc and one of said rollers for drive transmission in one direction, or between said disc and the other of said rollers for drive in the reverse direction.

2. A variable speed drive coupling as set forth in claim 1 wherein said roller means comprises two coaxially arranged spaced rollers each tapering outwardly from a neutral position defined by the space between them.

JOHN HALAHAN.
THEODORE F. ARONSON.
FLOYD A. LYON.

REFERENCES CITED

The following references are of record in the file of this patent:

UNITED STATES PATENTS

| Number | Name | Date |
|---|---|---|
| 662,380 | Mitchell | Nov. 20, 1900 |
| 1,229,879 | Buffat | June 12, 1917 |
| 1,317,915 | Ford | Oct. 7, 1919 |
| 2,002,585 | Rothwell, Jr., et al. | May 28, 1935 |
| 2,444,470 | Richardson | July 6, 1948 |
| 2,476,918 | Scheerer et al. | July 19, 1949 |
| 2,512,700 | Van Auken | June 27, 1950 |